Figure 1:
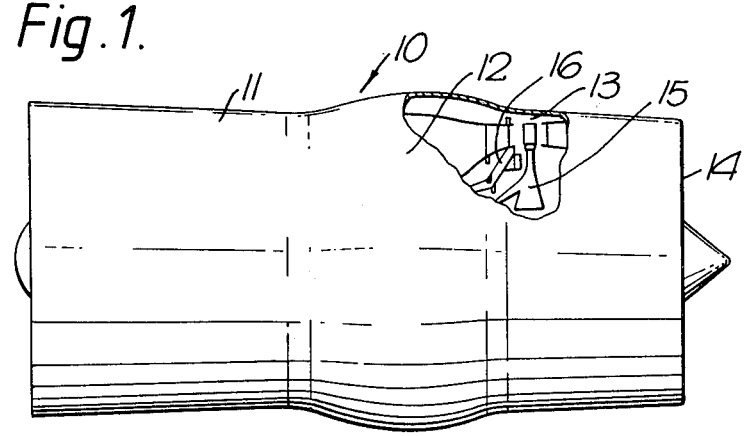

United States Patent [19]

Pask et al.

[11] 4,438,939

[45] Mar. 27, 1984

[54] ANNULAR SEAL FOR A GAS TURBINE ENGINE

[75] Inventors: George Pask, Stanton-by-Bridge; Howard J. Golton, Allestree, both of England

[73] Assignee: Rolls-Royce Limited, London, England

[21] Appl. No.: 256,672

[22] Filed: Apr. 22, 1981

[30] Foreign Application Priority Data

May 10, 1980 [GB] United Kingdom ................ 8015557

[51] Int. Cl.³ ............................................. F16J 15/08
[52] U.S. Cl. .................................... 277/236; 277/88
[58] Field of Search .............. 305/11; 277/188 R, 92, 277/236, 91, DIG. 6, 88, 89

[56] References Cited

U.S. PATENT DOCUMENTS

| | | | |
|---|---|---|---|
| 2,089,570 | 8/1937 | Petrelli | 277/89 |
| 2,713,482 | 7/1955 | Stapleton | 305/11 |
| 2,733,567 | 2/1956 | Zellweger | 305/11 |
| 3,028,163 | 4/1962 | Heinrich | 277/89 |
| 3,110,096 | 11/1963 | Yocum | 305/11 |
| 3,277,797 | 10/1966 | Tyree et al. | 277/188 R |
| 3,363,910 | 1/1968 | Toronchuk | 277/91 |
| 3,419,279 | 12/1968 | Tracy | 277/89 |
| 3,480,286 | 11/1969 | Anderson | 277/88 |
| 4,121,843 | 10/1978 | Halling | 277/236 |
| 4,216,973 | 8/1980 | Kessinger | 277/92 |
| 4,361,335 | 11/1982 | Vinciguerra | 277/236 |
| 4,375,891 | 3/1983 | Pask | 277/3 |

FOREIGN PATENT DOCUMENTS 2816930 10/1979 Fed. Rep. of Germany ... 277/DIG. 6
1434492 5/1976 United Kingdom .

*Primary Examiner*—Robert I. Smith
*Attorney, Agent, or Firm*—Cushman, Darby & Cushman

[57] ABSTRACT

An annular seal for a gas turbine engine comprises a stacked plurality of Belleville washers with at least some of their abutting peripheries held together by U-section rings. If only those peripheries pointing toward a lower pressure area are retained together, gas pressure will hold the other peripheries together. Because the U-section rings do not prevent the washers from changing the angle of their section, relatively large axial motion between the sealed members may be tolerated.

5 Claims, 4 Drawing Figures

ANNULAR SEAL FOR A GAS TURBINE ENGINE

This invention relates to an annular seal and is particularly concerned with a seal useful in the turbine of a gas turbine engine as described in the co-pending U.S. application Ser. No. 256,146, filed Apr. 21, 1981, by George Pask, and having the same assignee as this application, namely, Rolls-Royce Limited, London, England and now U.S. Pat. No. 4,375,891.

It is often desirable to provide an annular seal which will seal between two members and which will allow considerable relative axial motion between the members without losing its sealing integrity. There have been various attempts at solving this problem in the past using for instance bellows and piston ring type seals, but in the case of bellows the maximum axial motion is severely limited by the stress in the material and in the case of the piston ring type seal the frictional effects can be considerable.

The present invention provides a seal in which axial extension may be accommodated without extreme stresses or high frictional forces.

According to the present invention an annular seal for sealing between a higher and a lower pressure area comprises a stacked plurality of Belleville washers, adjacent washers being of opposite hand, and at least one U-section ring encircling the peripheries of those abutments between the washers extending toward the lower pressure area. The washers are retained together by the engagement of their peripheries abutting within the hollow of a U-section ring.

In some instances it may be preferable to retain all the washers together by engagement with U-section rings, but in a preferred embodiment the washers are retained together in pairs at those peripheries extending toward the lower pressure area.

Figure 3:
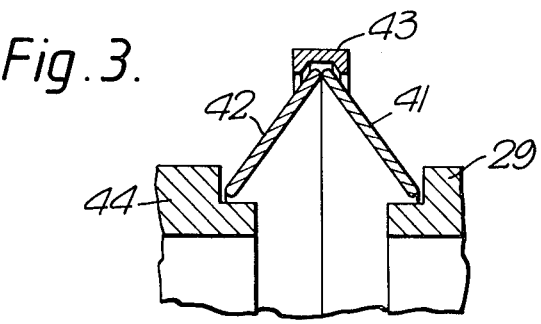
Figure 4:
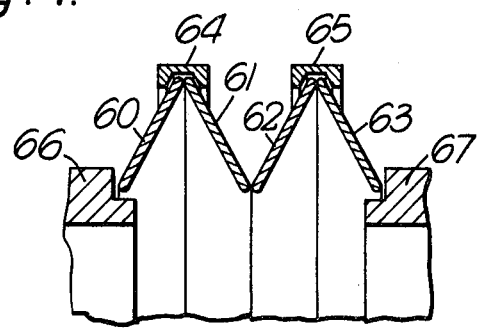
Figure 2:
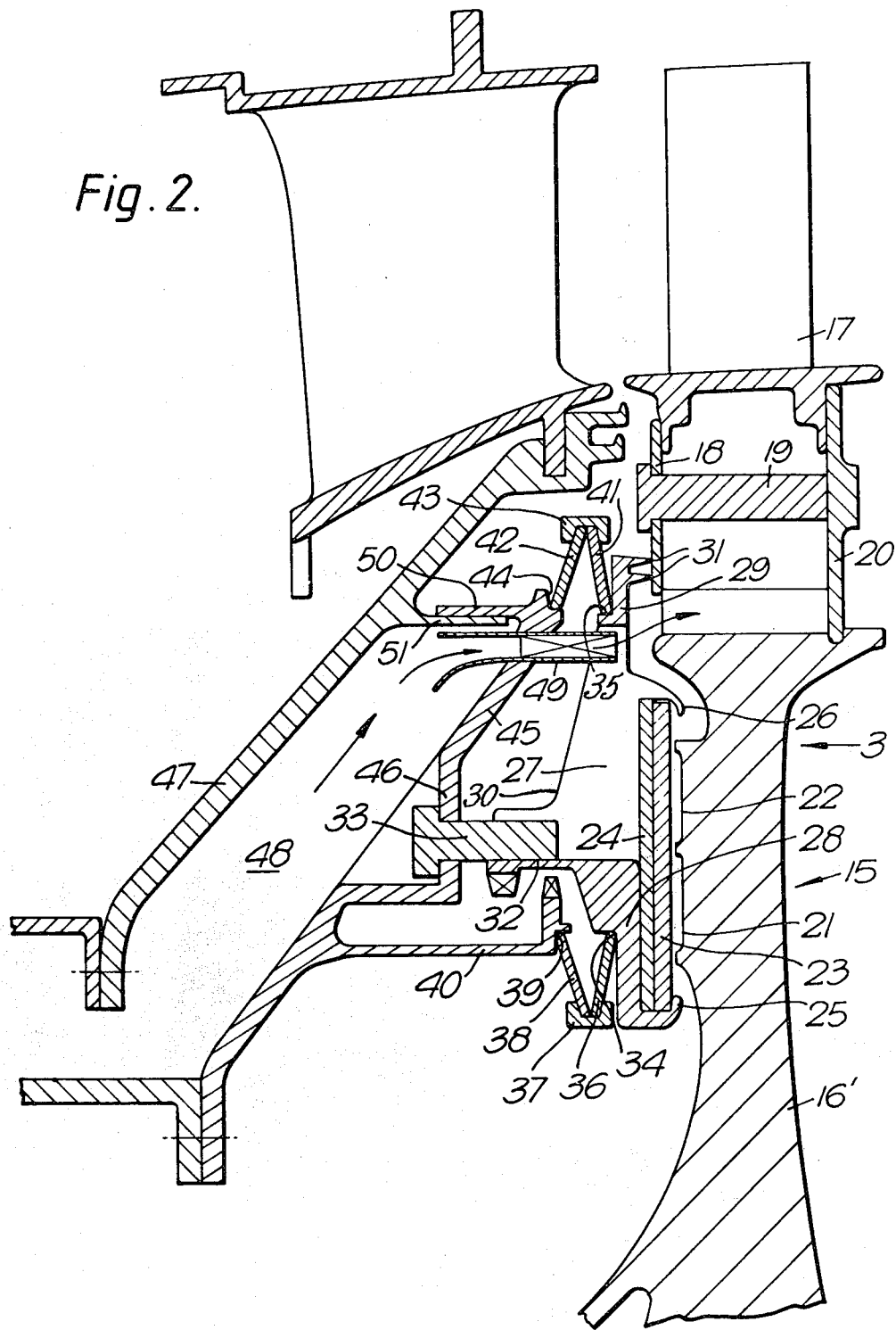

The invention will now be particularly described merely by way of example, with reference to the accompanying drawings in which:

FIG. 1 is a partly broken-away view of a gas turbine engine having a seal in accordance with the invention, FIG. 2 is an enlarged section of part of the turbine of FIG. 1 illustrating the seal, FIG. 3 is an enlarged section through the seal of FIG. 2 and, FIG. 4 is a view similar to FIG. 3 but of a further embodiment.

FIG. 1 shows a gas turbine engine 10 comprising a compressor section 11, combustion chamber 12, turbine 13 and final nozzle 14. The engine operates overall in a conventional manner which will not be elaborated here. It should be noted at this point that although described as a complete entity, the engine 10 could well comprise the core of a larger engine, such for instance as a fan engine.

It is well known that the sealing between the turbine rotor 15 of the engine and its associated static structure as at 16 is important to the efficiency of the engine, and FIG. 2 shows in more detail how the seal of the present invention is used in this environment.

Referring to FIG. 2, the turbine rotor 15 is seen to comprise a rotor disc 16' from the periphery of which a plurality of rotor blades 17 are supported by the normal fir-tree root structure. It is noteworthy that an annular plate 18 is held against the upstream face of the shanks of the blades 17 by a plurality of studs 19 which extend from respective ones of an annulus of seal plates 20 retained against the rear faces of the blade shanks. The annular plate 18 in this instance therefore provides a flat annular surface on the upstream face of the rotor with which a sealing member may cooperate. It should, however, be noted that it would be possible to form the plate 18 with annular fins which interdigitate with those of a sealing member.

The rotor disc 16' is conventional in form except for the upstream face which is provided with two concentric annular arrays of lift pads at 21 and 22. The arrays are adjacent to one another, and each consists of a plurality of shallow depressions bounded by walls on all sides except that facing the direction of motion of the disc. This will be recognised as a well-known type of air bearing. Although two arrays of pads are described it is clearly possible to use one or more such arrays to suit the circumstances.

The pads 21 and 22 coact with a ceramic annulus 23 to form a complete air bearing structure. The annulus 23 comprises a thin annulus of Silicon Carbide whose faces are transverse to its axis and having at least that face which cooperates with the pads 21 and 22 accurately formed in a plane.

The annulus 23 is backed by a similar metal annulus 24 and the complete composite annulus is held by inner and outer claws 25 and 26 respectively in a triangulated annular frame 27.

The frame 27 consists of inner and outer rings 28 and 29 interconnected by a plurality of links 30. From the inner ring 28 extend the claws 25, while the upper portions of the links 30 carry the claws 26. The outer ring 29 extends outwardly to form adjacent its radially outer periphery a pair of sealing fins 31 which cooperate with the surface of the plate 18 as mentioned above to provide a seal. Another feature of the framework 27 comprises an axially extending channel 32 open at its radially outer extent and in which locates a pin 33 whose function is to prevent circumferential motion and to maintain concentricity of the framework and hence of the annuli 23 and 24.

The seal of the invention operates between the framework 27 and the fixed structure 16 of the engine. It is clear that the framework 27 and annuli 23 and 24 must be carried from, and sealed to static structure of the engine. Accordingly, the rings 28 and 29 are provided in their rearward faces with annular steps 34 and 35 respectively. In the step 34 engages a frusto-conical or Belleville washer 36 which is retained at its outer periphery by a U-section ring 37 to a second, oppositely handed frusto-conical or Belleville washer 38. The washer 38 engages in an annular step 39 facing the step 34 and formed in an axially extending annular flange 40 forming part of the static structure of the engine.

In a similar manner the step 35 of ring 29 is engaged by one of a similar pair of oppositely handed Belleville washer 41 and 42 retained together by a U-section ring 43, the washer 42 engaging with a further step 44 formed in the outer periphery of a conical flange 45. The flange 45 also has formed therein pockets 46 within which are retained the pins 33.

The pairs of washers 36, 38 and 41, 42 and their retaining rings 37, 43 together form two combination seals and springs in accordance with the invention which load the frame 27 and hence the ceramic annulus 23 toward the rows of lift pads 21 and 22. The washers are held together at their abutting peripheries by the U-section rings but are not prevented from relative angular displacement of their sections. Therefore, axial movements are accommodated by angular displacement of the complete section of the abutting washers rather than at the abutment between the washers as is the case in conventional bellows type seals. Therefore a wide range of axial movement between the frame 27 and the static structure 16 may be accommodated without unduly stressing the washers. Also, as long as the washers are loaded against one another or the retainers 37 and 43 and against the radial annular steps, an effective seal is also provided.

It will be appreciated that in order to operate in a satisfactory manner the higher pressure must be on the side of the washers defining the convergent passage. Thus, the free edges of the washers will then be forced by the differential pressure against steps 39 and 44 of the static structure 16 and the steps 34 and 35 of the framework 27, while the rings 37 and 43 prevent the other edges of the washers being blown apart and destroying the sealing effect. Even with this restriction the seal is not likely to be perfect, but it does then give a metal-to-metal type of seal which is more effective than labyrinth or other non-contacting seals.

Therefore, the framework 27 and the ceramic ring 23 and seal members 31 which depend from it are mounted sealingly from the fixed structure comprised by the flanges 40 and 45, and are able to move axially to follow any axial motion of the rotor 15 relative to the fixed structure. The engagement between the pins 33 and the channels 32 forms a cross-key location which maintains the framework coaxial with the rotor and prevents rotation but allows radial expansion.

In order to provide the necessary cooling air to the blades 17 and also to provide the pressures necessary to pressure balance the frame 27, the conical flange 45 and a similar flange 47 spaced apart from it define a channel 48 for cooling air bled from the compressor section 11 of the engine. This air flows along the channel 48 and through a series of preswirl nozzles 49 in which the air is given a component of motion in the same direction as the rotation of the rotor 15. The air is precluded from otherwise escaping from the channel 48 by flanges 50 and 51 which extend from the conical flanges 45 and 47 respectively and sealingly engage with one another to complete the sealing of the channel 48.

Air which blows from the nozzles 49 passes through the spaces between the 30 of the triangulated frame structure 27 outside the outer periphery of the rings 23 and 24 and flows under the plate 18 to the roots of the blades 17, there to enter cooling passages (not shown) within the blades to cool them. This cooling air is prevented from escaping radially outwardly to rejoin the main gas flow annulus of the engine mainly by virtue of the seal formed between the fins 31 and the surface of the plate 18 and consequently the clearance between these should ideally be controlled to a constant very small value.

The construction described above enables this to be carried out by virtue of the operation of the annulus 23 and the lift pads 21 and 22 acting as an air bearing. It is a known attribute of these bearings that they operate to maintain a constant, small clearance between the static and rotating members, and in this way the annulus 23 retains in operation an almost constant position relative to the rotor disc 16. The seal fins 31 are positioned axially by the frame 27 and hence by the annulus 23, thus these fins also maintain a clearance from the annulus 18 which may be very small.

In addition to maintaining an overall clearance, the annulus 23 and its supporting structure are arranged to be flexible. In this way the seal structure can follow distortions of part of the rotor as well as movements of the entire rotor. This may be necessary to enable the seal to cope with vibrational movements of the disc, which often produce distortions of the 'standing wave' type.

FIG. 4 illustrates a further embodiment of seal in accordance with the invention. Here instead of two Belville washers, four such abutting washers 60, 61, 62 and 63 are used, the washers being of alternate hand and retained together in two pairs by two U-section rings 64 and 65. Operation of the seal is exactly similar in principle of that of the FIG. 3 embodiment, and in a similar manner the pressures across the seal must be higher on the inside of the seal (below the seal as shown in the diagram) and lower on the outside of the seal (above the seal as shown in the diagram).

However, in this embodiment the range of relative axial movement between the structures 66 and 67 with which the outer washers 60 and 63 engage is doubled compared with that of the FIG. 3 embodiment. Clearly this principle can be used to build up larger stacks of sealing washers, although if there is a 'free' pair of washers and ring it will be necessary to provide some means for retaining it in place radially.

Again, the embodiments described have the higher pressure on the inside of the annular seal and the low pressure on the outside. It is obviously possible to invert this arrangement, in which case the U-section rings would be arranged to hold the inner abutting portions of the washers together. If the pressure differential is likely to reverse it is of course possible to retain both the inner and the outer peripheries of the washers together with U-section rings so that the seal can operate in both directions of differential.

We claim:

1. A gas turbine engine comprising:

a first generally annular component having an axially facing annular surface;

a second generally annular component having an axially facing annular surface coaxial with and opposing said annular surface of said first component;

means permitting relatively large axial movement of said first annular component with respect to said second annular component without permitting relative rotational movement between said first annular component and said second annular component; and an annular seal for sealing between the annular surface of said first component and the annular surface of said second component while permitting the relatively large axial movement of said first annular component with respect to said second annular component, said annular seal separating a higher pressure area of the engine from a lower pressure area of the engine and comprising a stacked plurality of frusto-conical Belleville washers, adjacent washers being of opposite hand and having opposed abutting preipheries, and an annular ring U-shaped in cross-section for receiving and circumferentially enclosing the opposed abutting peripheries of said washers, said ring permitting said washers to be capable of complete angular displacement of each when there is a change of axial length of the stack of washers without extreme stresses and high functional forces being developed therein at the enclosed abutting peripheries of said washers, said annular ring enclosing the abutting peripheries of the washers extending toward said lower pressure area.

2. A gas turbine engine as claimed in claim 1 in which each of said washers of said annular seal is retained together in pairs at those abutting peripheries extending toward the lower pressure area.

3. A gas turbine engine as claimed in claim 2 wherein said annular seal comprises one said pair of said washers.

4. A gas turbine engine as claimed in claim 1 wherein said first annular component is provided with a second axially facing annular surface and said second annular component is provided with a second axially facing annular surface coaxial with and opposing said second annular surface of said first component, and wherein a second annular seal is provided between the second annular surface of said first component and the second annular surface of said second component, said second annular seal including a stacked plurality of frusto-conical Belleville washers, adjacent washers being of opposite hand and having opposed abutting peripheries, and an annular ring U-shaped cross-section for retaining those abutting peripheries extending toward the lower pressure area of said engine.

5. A gas turbine engine as claimed in claim 1 in which said first component is a static support structure of the engine and in which said second component is an air-bearing mounted seal carrying component.

* * * * *